June 7, 1955 G. HALLEWELL 2,709,903
FLEXIBLE COUPLINGS
Filed Dec. 18, 1951
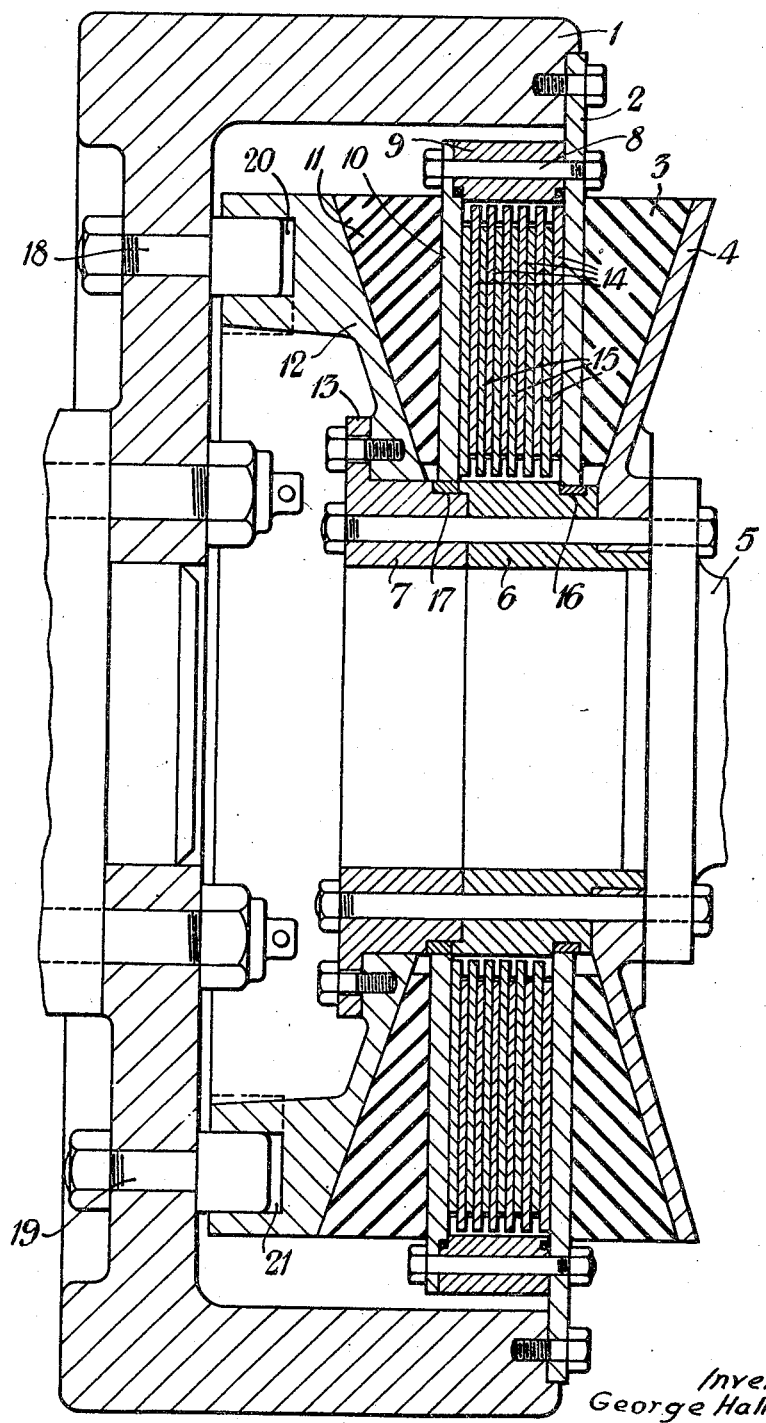
Inventor
George Hallewell,
By Jno Imrie
Attorney

United States Patent Office 2,709,903
Patented June 7, 1955

2,709,903
FLEXIBLE COUPLINGS

George Hallewell, Stamford, England, assignor to Blackstone & Company Limited, Stamford, England Application December 18, 1951, Serial No. 262,215

3 Claims. (Cl. 64—27)

This invention concerns flexible couplings for use in the transmission of power to a driven unit.

In mechanisms involving driving and driven units, and where either or both of these units possess characteristics which produce periodic variations in torque in the intermediate shafting, it is desirable to interpose a form of coupling having characteristics which will completely remove or render harmless any torsional oscillations which would otherwise be present.

The invention is directed to the provision of couplings which possess a high degree of torsional flexibility and which may incorporate means of high torsional damping capacity.

From one aspect the invention provides a flexible coupling comprised by a pair of annular members made of resilient material such as rubber each of which is bonded on one surface to an annular plate attached to and lying transversely to a driving member and is bonded on its other surface to an annular member attached to and lying transversely to a driven member, the arrangement of the parts being such that the annular plates may be bolted directly one to the other when torsional damping is not required or may be attached one to the other in spaced relationship to house a frictional or hydraulic damper interposed between the driving and driven members when torsional damping is necessary.

From another aspect the invention provides a flexible coupling comprised by a pair of annular resilient members attached on opposite surfaces to driving and driven members and spaced apart by means providing anchorage for the driving and driven parts of a damping device of the friction, hydraulic or viscous fluid type.

A feature of the invention is the provision of positive driving means incorporating a lost motion system so that the positive drive is only engaged on full allowable torsional movement of the resilient coupling.

The above and other parts of the invention are embodied in a preferred form of apparatus developed for marine diesel installations which will now be described in some detail by way of example, with reference to the accompanying drawing which is a longitudinal section on the axis of a coupling.

The flywheel 1 of the engine carries an annular plate 2 which projects inwardly from its rim. To the outer surface of the plate is bonded a rubber ring 3 of substantial thickness, which tapers in cross-section from outside to inside. To the outer tapering surface of the rubber ring is bonded a further annular plate 4 which is bolted to the flange of the driven shaft 5, the bolts are elongated and serve also to attach an inner ring of similar diameter to the flange and which is made in two parts 6 and 7 and extends towards the fly wheel.

Bolts 8 passing through the annular plate 2 carried by the fly wheel extend through an outer annular spacing member or ring 9 and carry a further annular plate 10 which is bonded on its outer surface to a further rubber ring 11. This further rubber ring 11 is of similar cross-section to that above described and is bonded in the same way to an annular plate 12 which is bolted near its inner edge to a flange 13 on the part 7 of the inner ring nearest to the flywheel.

The structure so far described consists in effect of two annular flexible couplings arranged between the engine fly-wheel and the driven shaft and held spaced apart by a two-piece inner ring 6, 7 coupled to the shaft and an outer ring 9 coupled to the flywheel.

The apparatus could be used in this state where no damping is required but it is preferred to remove the outer spacing ring 9 and the section 6 of the inner spacing ring adjacent the flange on the driven shaft, so that the inner annular plates 2 and 10 of the two flexible couplings can be bolted directly to one another.

Where damping of the variable torque of the engine is required the space between the flexible couplings is used to house a friction or other dampingdevice.

In this preferred form a series of annular discs 14 is anchored to the outer spacing ring 9 and is interleaved between a second series of discs 15 anchored to the inner spacing ring 6.

Sealing rings 16, 17 are provided between the inner annular plates of the couplings and the inner spacing ring 6, and provision is made for filling the whole space between the couplings with a fluid of requisite viscosity.

To provide for a positive drive (to safeguard the rubber of the flexible couplings) a pair of bolts 18, 19 whose heads protrude from the flywheel are set at 180° around its axis. The heads of the bolts work freely in elongated circumferential slots 20, 21 provided in lugs on the adjacent annular plate 12. The length of the slots 20, 21 is sufficient to permit the full torsional movement allowable in the rubber of the couplings before engagement is made with the bolt heads.

It will be understood that the invention is not restricted to the details of the specific embodiment described which may be varied without departing from the broad idea underlying it.

What I claim is:

1. A flexible coupling comprising a pair of axially spaced annular elements releasably secured to a driven member, a pair of axially spaced annular plates between said elements and releasably secured to a driving member, a pair of annular members of resilient material each respectively secured between a plate and an element, and damping means connected to the driving and driven members and fitted between the axially spaced annular plates.

2. A coupling as set forth in claim 1, in which the means for releasably securing the annular plates and the annular elements are radially spaced.

3. A flexible coupling as defined in claim 2, wherein said securing means includes a spacer ring removably interposed between said plates, and another spacer ring removably interposed between said elements.

References Cited in the file of this patent

UNITED STATES PATENTS

| | | |
|---|---|---|
| 1,693,765 | Parsons et al. | Dec. 4, 1928 |
| 1,965,742 | Junkers | July 10, 1934 |
| 2,016,154 | McWhirter | Oct. 1, 1935 |
| 2,234,443 | Macbeth | Mar. 11, 1941 |
| 2,476,894 | Mulheim | July 19, 1949 |

FOREIGN PATENTS

| | | |
|---|---|---|
| 546,487 | Great Britain | 1942 |